M. E. LEEDS.
SYSTEM OF AUTOMATIC CONTROL.
APPLICATION FILED AUG. 1, 1917.
1,332,182.
Patented Feb. 24, 1920.
4 SHEETS—SHEET 3.
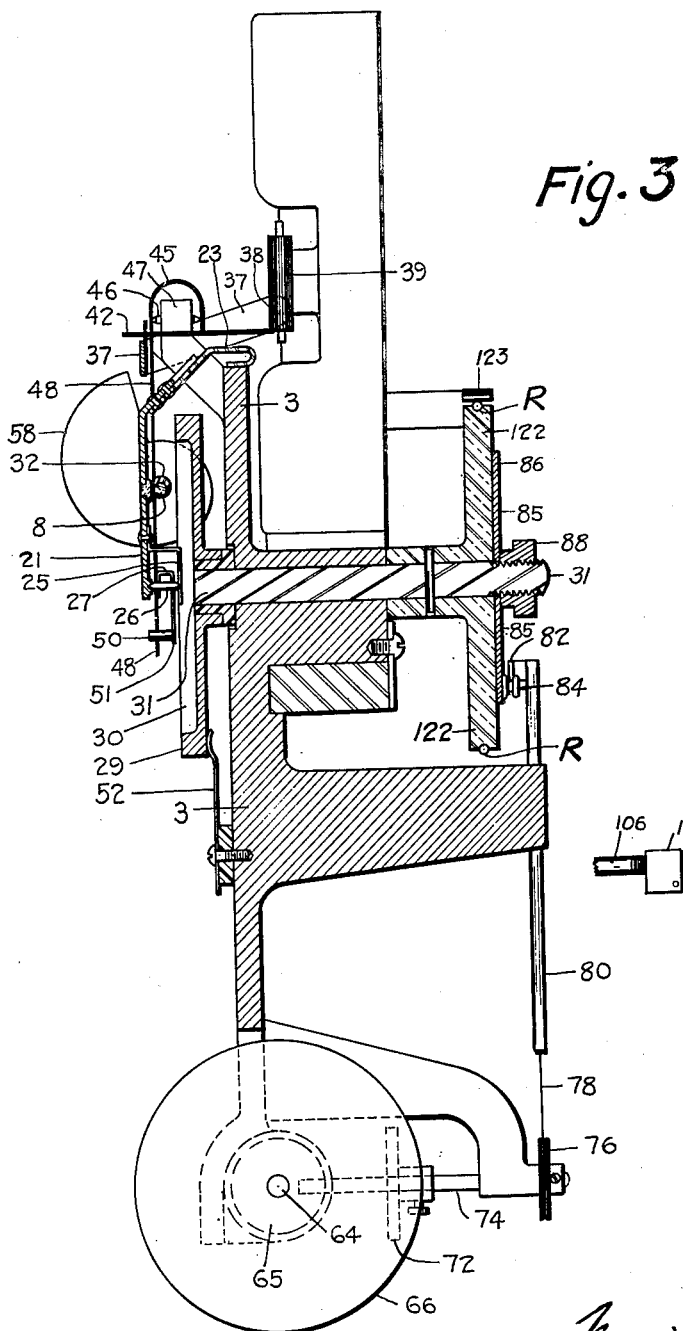
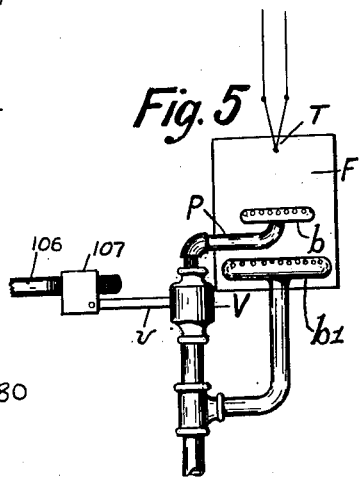
INVENTOR
Morris E. Leeds
by Cornelius D. Ehret
his ATTORNEY

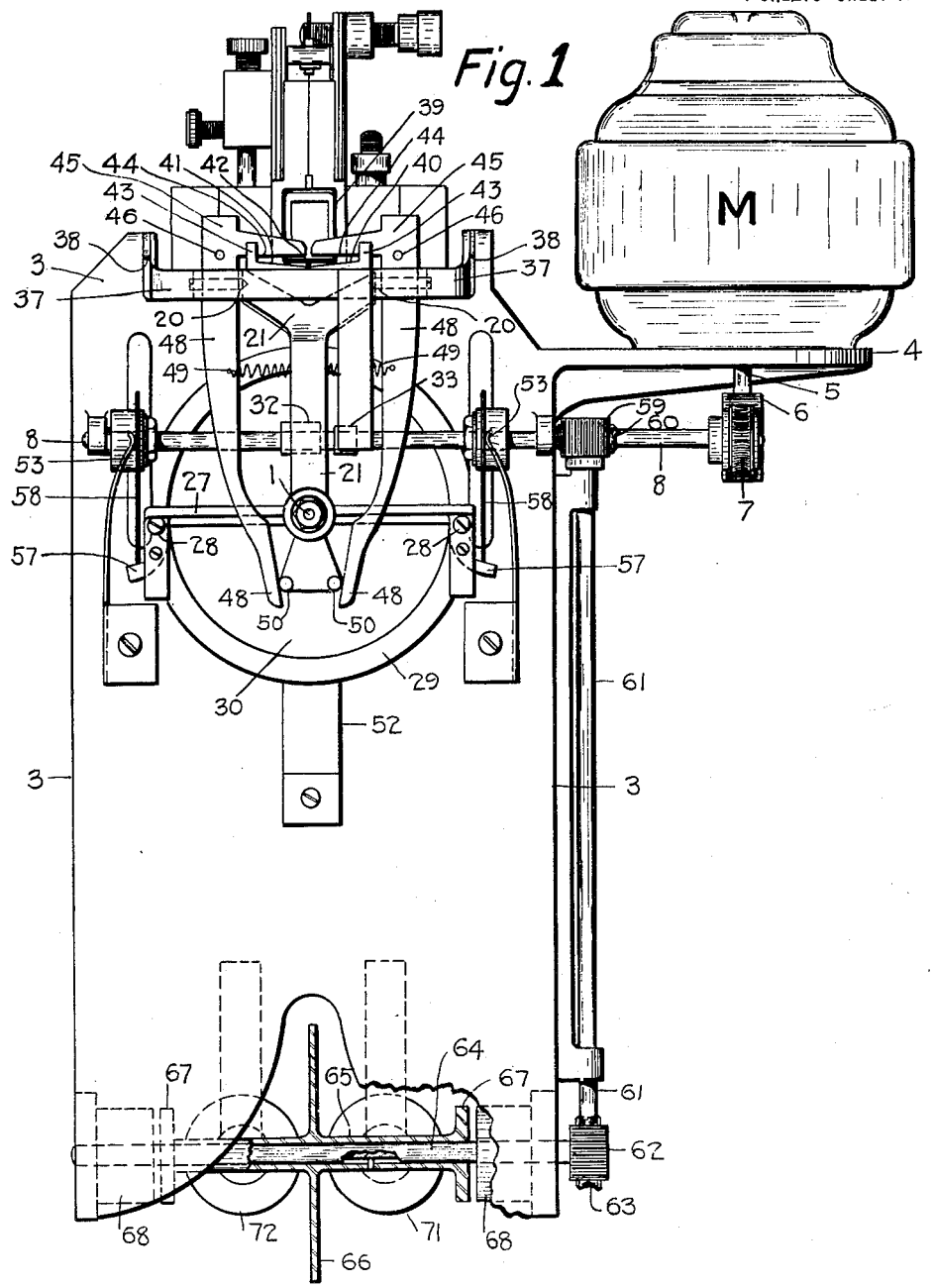

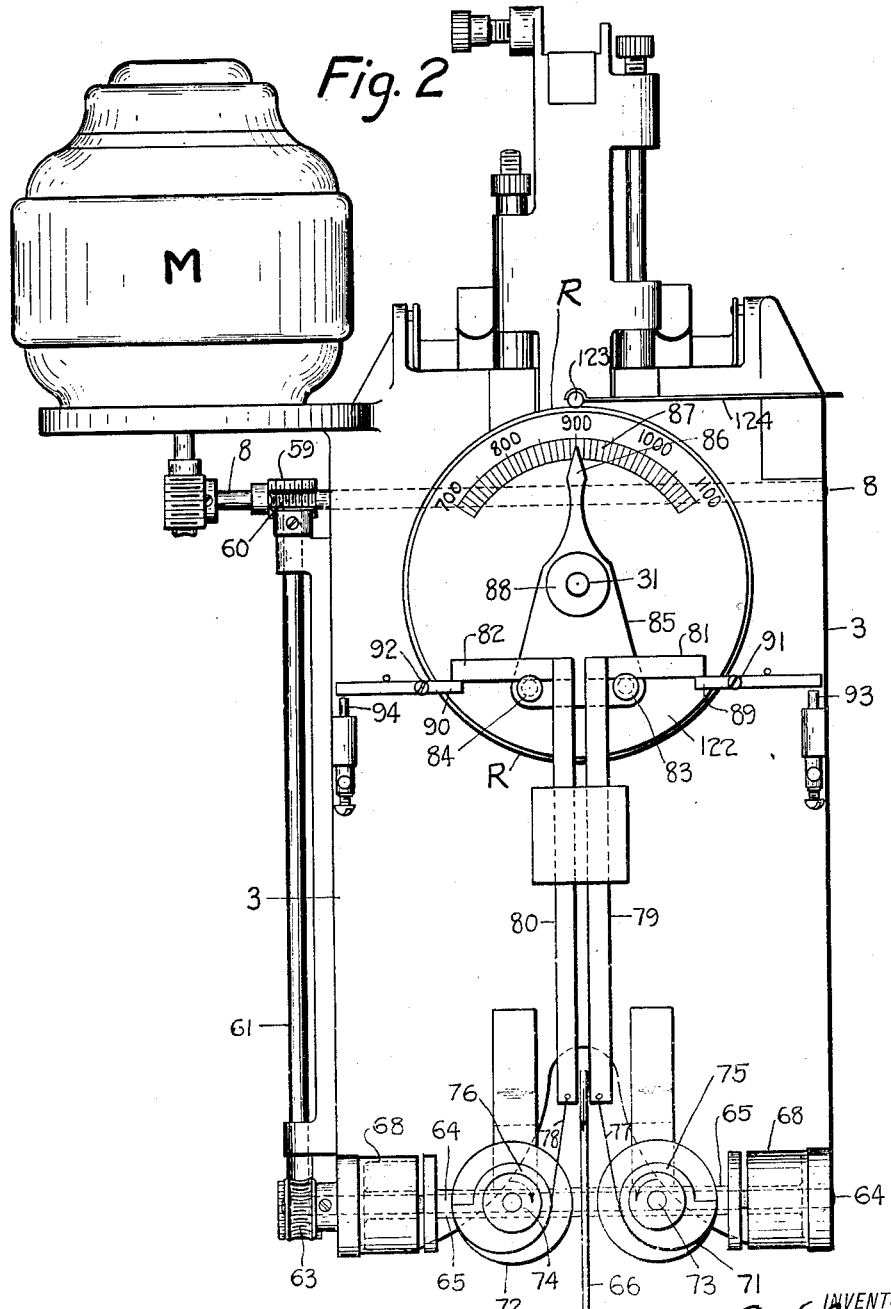

M. E. LEEDS.
SYSTEM OF AUTOMATIC CONTROL.
APPLICATION FILED AUG. 1, 1917.

1,332,182.

Patented Feb. 24, 1920.
4 SHEETS—SHEET 4.

INVENTOR
Morris E. Leeds
by Cornelius D. Ehret
his ATTORNEY

UNITED STATES PATENT OFFICE.

MORRIS E. LEEDS, OF PHILADELPHIA, PENNSYLVANIA, ASSIGNOR TO LEEDS & NORTHRUP COMPANY, OF PHILADELPHIA, PENNSYLVANIA, A CORPORATION OF PENNSYLVANIA.

SYSTEM OF AUTOMATIC CONTROL.

1,332,182.  Specification of Letters Patent.  Patented Feb. 24, 1920.

Application filed August 1, 1917. Serial No. 183,895.

*To all whom it may concern:*

Be it known that I, MORRIS E. LEEDS, a citizen of the United States, residing in the city of Philadelphia, county of Philadelphia, and State of Pennsylvania, have invented new and useful Systems of Automatic Control, of which the following is a specification.

My invention relates to a system or apparatus for controlling the temperature of a furnace or any other device, and in general for procuring automatic regulation of a system to maintain substantially constant any desired electrical, thermal, chemical or physical condition.

In the common practice of furnace control, for example, thermometers or pyrometers are used to control increase of the heat supply whenever and as long as the temperature is below that desired and to decrease it in the same way when above that desired. Generally, the heater cannot be exactly the same as the part of the furnace to be controlled where the pyrometer will be located, and due to heat capacity and resistance to heat flow of the various parts there will be a time lag in temperature between them, and particularly between the heater and the pyrometer. As a result of these conditions the controller will act to increase the rate of heat supply when the temperature is low until the pyrometer has reached the normal temperature, by which time parts of the furnace will be above normal and the rate of supply above that required to hold it there, and as a result the temperature will rise much above normal before the controller can act to reduce the supply sufficiently to cause the temperature to decrease. For the same reasons it will again over-shoot the mark and allow the temperature to fall much below normal before increasing the heat supply. The action will be repeated, carrying the furnace alternately to too high a temperature and too low a temperature, causing what may be termed "hunting". With the controllers now in use "hunting" can be overcome in part by allowing a prolonged interval between the control operations, so as to let the temperatures equalize, but this procedure makes the return to desired temperature slow, and when conditions are changing allows large departure from the desired temperature.

By my invention, however, such erratic control and the resultant hunting is overcome, and the temperature of the furnace returned to normal or desired temperature at a predetermined rate in a shorter time, by first causing delivery of heat into the furnace at a rate which if continued will raise the furnace to a temperature above the desired or normal temperature, and then as the furnace responds to this excessive input of heat energy by rising in temperature, decreasing the rate of the energy input, and so continuing the operation until the furnace arrives at the desired temperature, at which time the rate of energy input is just sufficient to maintain it at that temperature.

In other words, at first the energy is introduced into the furnace at an excessive rate and that rate is gradually diminished in anticipation of the arrival of the furnace at the desired or normal temperature. And in case the furnace may be at a temperature above the normal or desired temperature, the same mode of operation is practised, but in a reversed sense, to cause a fall at temperature in a predetermined rate to the desired or normal temperature and the furnace thereafter maintained thereat. The operation of my controller depends not only on whether the temperature is above or below that desired, but also on the amount of the departure from the desired temperature, the rate of departure or approach to desired temperature, and on the furnace characteristics.

For this purpose I have devised apparatus embodying my invention and comprising means for automatically effecting at first when the furnace is at a temperature different from the desired temperature great changes in the energy input into the furnace and automatically gradually reducing these changes, and reversing them in direction, as the furnace approaches desired or normal temperature, subject to a time control mechanism, whereby the furnace tends to return to the desired or normal temperatures at a rate predetermined by such timing mechanism. This mechanism may, depending on the conditions to be controlled, provide a constant or variable rate of return to the desired temperature.

This mode of operation I attain by apparatus of the character herein described and illustrated and constituting a preferred embodiment of my invention.

For an illustration of one example of apparatus and circuit arrangements embodying and suitable for carrying out my invention reference is to be had to the accompanying drawings, in which:

Figure 1 is a front elevational view of part of my apparatus.

Fig. 2 is a rear elevational view of the same.

Fig. 3 is a vertical sectional view, some parts in elevation, of the apparatus shown in Figs. 1 and 2.

Fig. 5 is a fragmentary view illustrating a furnace heated by combustion.

Figure 4:
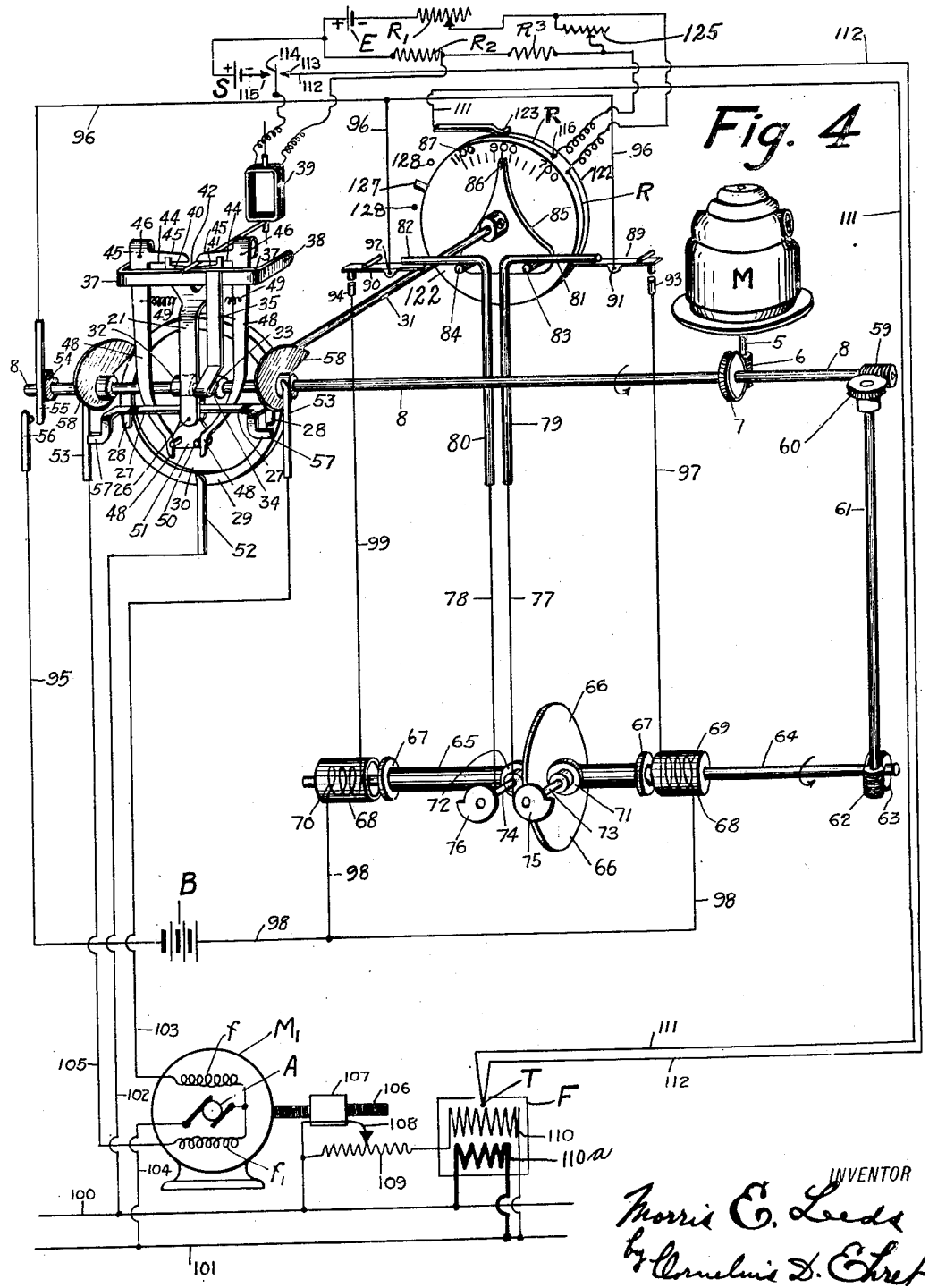
Fig. 4 is a diagrammatic view of circuit arrangements together with perspective view of parts of the associated apparatus.

In the illustrated example of my apparatus parts thereof and their mode of operation are similar to parts of the apparatus and their mode of operation disclosed in my prior Patent No. 1,125,699, January 19, 1915.

Referring to the drawings, M is an electric motor, or any other suitable motor, which rotates the shaft 5, preferably at substantially constant speed, which in turn drives the worm 6 which meshes with and drives the worm gear 7 secured upon the shaft 8 having suitable bearings on the frame 3, on a bracket 4, on which the motor M is mounted. Supported and movable upon the pivots 20 carried by the base or frame 3 is a lever 21. Upon the back of the member 21 is secured a bracket 25, Fig. 3, between which and the member 21 and carried by them is a pivot 26 by which the arm 27 is pivotally mounted; and on each end of the arm 27, at 28, is a metal shoe for frictionally engaging the rim 29 of the clutch disk or wheel 30 secured upon the shaft 31 having a bearing in the frame 3 and preferably co-axial with pivot 26. Secured upon the shaft 8 is a cam 32 which periodically engages the lever or member 21 and moves it outwardly in opposition to the spring 23, thereby lifting the shoes 28 free from the rim 29 of the wheel 30, the spring 23 returning the shoes 28 into engagement with the rim 29 after predetermined rotation of the cam 32. Upon the shaft 8 is secured a second cam 33 which, immediately after the cam 32 has caused the lifting of shoes 28 from rim 29, engages the end of finger 34, Fig. 4, on the lower end of the arm 35 which is secured at its upper end to the member 37 pivoted at 38 to the base or frame 3. Upon the frame or member 37 is secured the member 40 whose upper edge 41 is inclined and increases in height from the center outwardly. Disposed immediately above the edge 41 is the needle or pointer 42 of any suitable measuring or indicating instrument, as for example, a galvanometer having the movable coil 39 which actuates or deflects the attached pointer or needle 42. At opposite ends of the member 40 are the abutments 43 for limiting the deflection or swing of the needle 42. Directly above the needle 42 and beneath which it normally freely swings are the edges 44, preferably straight horizontal edges, upon the members 45 pivoted to the bracket 47 on the frame 3 at 46, 46. The members 45, 45 extend toward each other, leaving a gap of sufficient width between their ends to allow the free entry of the needle 42 when the same is in the balanced, zero or mid-position, the needle 42 normally swinging freely between the edge 41 of member 40 and the lower edges of the members 45. The members 45, 45 have the downwardly extending arms 48, 48 drawn toward each other by the spring 49. Associated with the lower ends of the arms 48, 48 are the pins 50, 50 upon the triangular member 51 operatively secured to the member 27.

At each end of the arm or member 27 and insulated therefrom are carried the metal ears or projections 57, 57 in electrical communication with the shoes 28, 28 and which are adapted to be engaged by the cams 58, 58 similar in shape and similarly positioned and secured upon the shaft 8, these ears 57, 57 being in electrical communication with each other and with the contact 52 through the wheel 30 with which the contact 52 continuously engages, the contacts 57, 57 being in electrical communication with the wheel 30 through any suitable means, the wheel 30 being suitably insulated, by any suitable means, from the remainder of the apparatus. The cams 58, 58 are insulated by any suitable means from and rotated by the shaft 8, and with the cams 58, 58 continuously engage the contacts 53, 53 which maintain electrical communication for purposes hereinafter described. Secured upon the shaft 8, Fig. 4, is a cam 54 which actuates the contact 55 to periodically engage the co-acting contact 56.

Secured upon the shaft 31 is a disk or wheel 122, of wood or other insulating material, carrying upon its periphery the resistance conductor R, which may be in the form of a helix. Engaging the resistance R is a stationary contact 123 carried at the end of a spring 124 carried by and suitably insulated from the base 3.

A worm 59 on the shaft 8 rotates the gear 60 secured upon shaft 61 which in turn rotates the worm 62, which rotates the gear 63 secured upon the shaft 64. Movable longitudinally on the shaft 64, but rotated thereby, is the sleeve 65, which rotates the friction disk 66. Secured upon the ends of the sleeve 65 are the armatures 67, 67 of electro-magnets comprising the jackets 68, 68 inclosing the windings 69 and 70. On opposite sides of the disk 66 and normally spaced therefrom are the wheels 71, 72, with their planes normal to the plane of the disk 66, and secured respectively upon the shafts 73, 74 carrying, respectively, the cam-shaped pulleys or members 75, 76. The wheels 71, 72 may be secured at any desirable or suitable position longitudinally of their shafts 73, 74, thereby changing the distance of their contact with the wheel 66 from the center of wheel 66 and thereby changing the speed of return of disk 122 for timing purposes. Secured to the cams 75, 76 and adapted to be wound up thereon, beginning in the example illustrated at their points of greatest distance from the shafts 73, 74 are the cords or wires 77, 78 attached, respectively, to the lower ends of the rods 79, 80 having at their upper ends the oppositely extending arms 81, 82 adapted to engage, respectively, the pins 83, 84 secured upon the plate 85 carrying a pointer 86 coöperating with a scale 87 upon the wheel or disk 122. By thumb nut 88, Figs. 2 and 3, the disk 122 may be adjusted to any suitable angular position with respect to the plate 85.

The arms 81 and 82 coöperate with the contact levers 89, 90, respectively, pivoted at 91 and 92, and adapted to engage with their free ends the contacts 93 and 94. With the parts in normal position indicated, the arms 81, 82 hold the contact arms 89, 90 against gravity, away from their associated contacts 93, 94.

One terminal of the source of current B connects by conductor 95 with the switch contact 56 whose other contact 55 connects by conductor 96 with the contact arms 89 and 90; the contact 93 connects by conductor 97 with one terminal of the electro-magnet winding 69 whose other terminal connects by conductor 98 with the remaining terminal of the source B; and the contact 94 connects by conductor 99 with one terminal of the electro-magnet winding 70 whose other terminal connects to the other terminal of the source B through conductor 98.

The electric supply circuit whose conductors are 100 and 101 delivers electric energy for operating the electric furnace F and the electric motor $M_1$. The contact 52 is connected by conductor 102 with supply circuit conductor 100; one of the contacts 53 connects by conductor 103 to one terminal of the series field winding $f$ of the motor $M_1$ and whose other terminal connects with one terminal of the armature A of the motor whose remaining terminal connects through conductor 104 with supply circuit conductor 101; and the other contact 53 connects by conductor 105 with one terminal of the series field winding $f_1$ whose other terminal connects with one terminal of the armature A. These field windings $f$ and $f_1$ are wound in such direction or so connected that they magnetize the field of the motor $M_1$ oppositely and therefore, since they are not simultaneously energized, will cause the armature A to rotate in the one direction or the other. Rotated by the armature A is a screw 106 with which engages the nut member 107 carrying the movable contact 108 connected to the supply circuit conductor 100 and engaging the rheostat conductor or resistance 109 whose one terminal connects with one terminal of the furnace resistor conductor 110, whose other terminal connects to the supply circuit conductor 101.

It will be understood that in place of using a separate source of current B hereinbefore referred to, the conductors 95 and 98 may connect respectively to the conductors 100 and 101.

In the example herein illustrated the galvanometer coil 39 coöperates with a potentiometer circuit as in said prior Letters Patent No. 1,125,699. It will be understood, however, that the coil 39 may be used in association with any other suitable circuit arrangement adapted to the apparatus and system herein described, or to any equivalent control apparatus or system.

In the present instance the potentiometer resistance R is connected in series with the battery or other suitable source of current E, the adjustable resistance $R_1$ and the resistance $R_2$. In series with these resistances may be employed additional resistance indicated at $R_3$. T is a thermo-couple subjected to the temperature within the furnace F and whose one terminal connects by conductor 111 with the contact 123 and whose other terminal connects by conductor 112 with the switch contact 113 with which engages the switch lever 114 connected to one terminal of the galvanometer coil 39 whose other terminal connects with one terminal of the resistance R. A standard cell S has its one terminal connected to a second switch contact 115 and its other terminal connected to one terminal of the resistance $R_2$.

To determine correct strength of current through the resistance R from the source E, the resistance $R_1$ is adjusted to such value that when the switch 114 is in engagement with contact 115 the coil 39 of the galvanometer will not deflect, indicating that the fall of potential through the resistance $R_2$ due to the current from the source E is equal and opposite to the electro-motive-force of the standard cell S.

The operation is as follows:

Assuming it to be desired that the furnace F shall be maintained at a temperature of say 900 degrees, the plate 85 is held in its normal position indicated in the drawings and shaft 31 and disk 122 adjusted to and secured in that angular position with respect to the plate 85 in which the pointer 86 registers, with the 900 degree marking of the scale 87.

If the temperature of the furnace is 900 degrees the thermo-couple T will produce an electro-motive-force equal to the fall of potential caused by current from the battery E through that part of the resistance R between the contact 123 and the terminal 116 of the resistance R. Under such condition there is no current flow through the galvanometer coil 39 and it is therefore in its zero or non-deflecting position illustrated, its pointer or needle 42 being then in the mid-position and is merely lifted periodically by the member 37 into the gap between the ends of the members 45, 45, and all parts remain in normal position.

Suppose, however, that the temperature of the furnace has fallen below the desired temperature, as for example, to 700 degrees. The thermo-couple T will accordingly generate an electro-motive-force of less value than before, and of a value different from the fall of potential between the contact 123 and terminal 116 of resistance R, the latter now being greater than the electro-motive-force of the couple T. In such case a current will flow through the galvanometer coil 39, due to this inequality in electro-motive-forces, and the needle 42 will be deflected toward the right, Figs. 1 and 4, and the extent of deflection will be the greater as the aforementioned inequality is the greater. The needle 42 being deflected to a position between the edge 41 of member 40 and the lower edge 44 of the right hand member 45, the cam 32, driven by the constantly rotating shaft 8, will first tilt the member 21 upon its pivots 20 and lift the shoes 28 from the rim 29 of the wheel 30; immediately thereafter, and while the shoes 28 are still raised from rim 29, the cam 33 will raise the frame 37 and the attached member 40 and clamp the now deflected needle 42 between the edge 41 and the lower edge 44 of the right hand member 45, causing the member 45 to rise and rotate about its pivot 46, causing the lower end of the right hand arm 48 to force the right hand pin 50 toward the left, thereby tilting the arm 27 in a clockwise direction through an angle whose extent is dependent upon or proportional to the extent of deflection of the needle 42. After the cam 33 has released the frame 37 the cam 32 will allow the member 21 to return under the influence of spring 23 to its normal position and bring the shoes 28 into engagement with the rim 29 of the wheel 30 in the angular position to which the arm 27 has been moved. Thereafter the left hand cam 58 will engage the contact ear 57 on the arm 27 and rotate it and wheel 30 and shaft 31 counter-clockwise to position where arm 27 is again in normal position. Engagement of ear 57 by said cam 58 closes a circuit through the motor $M_1$ with the series field winding $f_1$ in circuit, the field winding $f$ in the meantime being out of circuit. The armature A will rotate the screw 106 in such direction as to cause the nut member 107 to move toward the right, and thereby reduce the amount of resistance 109 in circuit with the furnace resistor 110, thereby causing more current to flow through said resistor 110, with consequent greater energy delivery to the furnace F which will accordingly begin to rise in temperature. This contact between the cam 58 and its associated contact 57 will continue until the arm 27 has been restored to normal or horizontal position, and accordingly the duration of the contact and energization of the motor $M_1$ will depend upon the extent of the angle through which the arm 27 has to be moved to restore it to normal, and this angle is in turn dependent upon the extent of deflection of the needle 42, which in turn is dependent upon the extent of difference of temperature of the furnace F from desired temperature.

The return of the arm 27 to normal or horizontal position is accompanied by a counter-clockwise rotation of the wheel 30 through an angle equal to the angle through which the arm 27 was displaced by the arm or lever 48.

Employing only this much of the mechanism, each revolution of the shaft 8 would cause a repetition of the above described operations and a further increment in the rate of heat supply until the thermo-couple reached the normal temperature of 900 degrees, at which time parts of the furnace closest to the heater would be above that temperature and all of it would be rapidly getting hotter, and before the apparatus could operate to cut off part of the heat supply, the temperature would rise much above 900 degrees and the reverse set of operations would be brought about, again over-shooting the mark in the reverse direction. The following operations prevent this faulty regulation or hunting.

Since the disk 122 is positively coupled to the wheel 30 it is likewise rotated in counter-clockwise direction through an equal angle, with the result that the contact 123 is in effect moved toward the terminal 116 of the resistance R, so that there is less of that resistance included between the contact 123 and the terminal 116, with the result that the fall of potential between these two points is less than it was before such counter-clockwise movement of the disk 122, and with the further result that the current through the coil 39 is diminished toward zero value, with resultant decrease in the extent of deflection of the needle 42. The action is such, therefore, as to tend to move the disk 122 toward or to a position in which the potentiometer is in balance for the then temperature of the furnace.

But the counter-clockwise rotation of the disk 122 is partaken of by the plate 85, with the result that the pin 84 takes a lower position, without effecting closure of contacts 90, 94, while on the other hand, the pin 83 is raised and carries upwardly with it the extension 81 on the rod 79 which pulls upwardly upon the cord 77 and rotates the cam 75 in a clockwise direction, as viewed in Fig. 4. Obviously the extent of rise of the pin 83 and therefore extent of rotation of cam pulley 75 will depend upon the extent of angular movement of the disk 122, which in turn is dependent upon the difference of the temperature of the furnace from the desired temperature. When the pin 83 is raised as described, the member 81 is raised and the contact lever 89 rotates under the influence of gravity in a clockwise direction about its pivot 91 and engages the contact 93, with the result that the electro-magnet winding 69 is energized when contacts 55 and 56 are in engagement with each other. And these contacts 55 and 56 are so controlled by the cam 54 that they are in engagement with each other only when the clutch shoes 28 are raised from the rim 29, whereby disk 122 may be actuated by member 81 or 82 only when wheel 30 is free to rotate. The armature 67 associated with winding 69 is accordingly attracted toward the right, Fig. 4, moving the attached sleeve and disk 66 toward the right, bringing the latter into driving engagement with the wheel 71 and causing the cam pulley 75 to rotate in a counter-clockwise direction and pull downwardly upon the cord 77 and rod 79, causing the member 81 to descend, and, under certain circumstances, engage pin 83 and move the disk 122 in a direction opposite to that in which it was last moved by the clutch mechanism comprising the shoes 28 and wheel 30.

From the foregoing it will be understood that when the furnace is below the normal or desired temperature the galvanometer needle 42 deflects and causes periodic energization of the motor $M_1$ to cause the resistance 109 to be diminished by successive increments, an increment for each rotation of the shaft 8, with a resultant rise in temperature of the furnace which results in diminished deflection of the needle 42 with consequently diminishing increments of movement of the contact 108 on resistance 109. And during such operation the disk 122 is rotated in direction tending to bring about a balance of the potentiometer circuit, and therefore zero deflection of the needle 42, for the temperature below normal, at which the furnace may be at any time.

Were it not for the members 81 and 82, and their associated actuating and controlling mechanism, the disk 122 would be automatically eventually rotated to a position in which the potentiometer circuit is balanced, with resultant zero deflection of needle 42, for a temperature other than the normal or desired temperature, as for example, a temperature still below the normal or desired temperature. Under such circumstances the pin 83 would still be in an elevated position, and the descent of the hook member 81 would cause a rotation of the disk member 122 in clockwise direction, thereby throwing the potentiometer circuit again out of balance and causing a deflection of the needle 42 in the same direction as before and setting the motor $M_1$ again into operation, periodically to reduce by further increments the amount of resistance in the rheostat 109, again increasing the furnace heating current, causing further rise in temperature of the furnace, which is responded to by diminishing deflection of the needle 42 resulting in diminished periods of energization of the motor $M_1$ with correspondingly diminished increments of variation of resistance 109.

Accordingly the potentiometer circuit can be permanently balanced only when the hook member 81 has descended to normal position and thereby rotated the disk 122 to its position corresponding with the desired or normal furnace temperature.

The hook member 81 and its associated actuating and controlling means is in effect a timing mechanism which returns from any position to which it is moved by upward movement of the pin 83 back to normal position in a predetermined total time, determined by the speed of rotation of the disk 66, the circumference of the wheel 71 and its distance from the center of the shaft 64, and upon the size of the cam 75. And the variation in the rate at which the member 81 returns to normal position is determined by the shape of the cam 75, this rate of return and the time occupied in return being predetermined and made to depend largely upon the thermal constants of the furnace F.

In bringing the furnace from a lower temperature back to normal or desired temperature the contact 108 will not always move toward the right, that is, in direction to reduce the resistance 109, but the motor $M_1$ may be reversed to cut in resistance in the rheostat 109 and so reduce the furnace current, though the furnace is still rising in temperature. This condition will obtain when the furnace is rising in temperature too rapidly because the heating current in the resistor 110 has been increased to such an amount or increased at such a rapid rate that the temperature of the thermo-couple T exceeds that for a balance of the potentiometer circuit at some point to which the disk 122 has previously been moved, and the needle 42 will deflect in opposite direction, to the left as viewed in Fig. 4, and cause the arm 27 to be tilted in opposite direction and restored by the right hand cam 58, which thereby energizes the motor $M_1$ through its series coil $f$, causing it to rotate in opposite direction and move the contact 108 toward the left and thereby cut resistance into the circuit of resistor 110. Simultaneously disk 122 is rotated in clockwise direction from its previous position, the apparatus tending automatically to balance itself at some new temperature.

As the furnace rises in temperature, therefore, the resistance 109 is varied by suitable increments, which increments are larger as the unbalancing of the potentiometer circuit is larger, to decrease and increase the resistance 109 at suitable time and rates, so that the furnace F comes back to the desired or normal temperature in approximately the time for return of the hook member 81 to its normal position, which requires that the disk 122 shall be in the position illustrated in Fig. 4, at which time the potentiometer circuit may attain a balance for the desired or normal temperature of the furnace.

If during such rise in temperature of the furnace F the conditions should be such that the furnace temperature rises at a rate greater than required to accord with the descent of the hook member 81, the needle 42 will deflect toward the left and the disk 122 will be rotated in clockwise direction, as described, causing the pin 83 to descend more rapidly than would otherwise be enforced by the hook member 81 actuated through the cam 75. Under such circumstances, however, resistance is being cut into the rheostat 109 and the rapid rise in furnace temperature will be checked and the hook member 81 may then again be actuated by the cam 75 to pull downwardly upon the pin 81 and resume the normal and intended operation as to rate of return to normal conditions.

While the potentiometer circuit and its controlled mechanism tend to maintain a balance of the potentiometer circuit for all temperatures of the furnace through which it passes in rising toward normal, the timing device, of which the hook member 81 is a part, prevents permanent balance until the furnace has again attained normal or desired temperature. This is due to the fact that the member 81 operates to rotate the disk 122 in such direction as to cause unbalancing of the potentiometer circuit for all temperatures below the normal or desired temperature, therefore serving as a time control upon the mechanism to prevent reëstablishing of balance except after predetermined time at a predetermined or desired temperature.

On the whole, the action of the apparatus is to deliver heating energy to the furnace at a more rapid rate when it is farther from desired or normal temperature and to diminish the rate as the furnace approaches the desired temperature, and to finally insure that rate of energy delivery to the furnace when it reaches desired or normal temperature which will maintain it substantially at that temperature. Furthermore, in case the furnace cools for any reason at a rapid rate, the apparatus automatically delivers heat energy to the furnace at a suitably increased rate, and conversely, when the furnace heats at a more rapid rate the reduction or decrease of heat energy will be effected at a more rapid rate by the control apparatus. Or in general, the more rapid the change of temperature or other condition the more rapid is the control or restoration effected by the apparatus.

The automatic control above described prevents "hunting" or passage of the furnace temperature to values above and below the desired or normal temperature, and the furnace is brought quickly or in a predetermined time to normal or desired temperature without substantially passing that temperature, and is maintained at the desired temperature.

While the foregoing description of operation has had regard to a condition where the temperature of the furnace is too low, the reverse operation takes place when its temperature is too high, in which case the disk 122 is rotated in a clockwise direction accompanied by increase of resistance 109, and under such circumstances it is the hook member 82 which controls the duration and rate of return to normal temperature.

The cams 75 and 76 may be similar in shape and size and speed of rotation, or they may be dissimilar, as may be desired and as may be required to suit particular circumstances.

By shunting the resistance R by the adjustable resistance 125 the extent of deflection of the needle 42 and therefore the extent of angular movement of the disk 122 for a given temperature difference may be adjusted, more particularly for the purpose of causing the range of movement of the disk 122 to be confined within suitably small limits.

Or limitation of the range of movement of the disk 122 may be accomplished by securing thereto a pin 127 coöperating with the stationary abutments or stops 128, 128, the clutch shoes 28 slipping upon the rim 29 of the wheel 30 when pin 127 engages one of these abutments, the motor $M_1$ being nevertheless periodically energized so long as needle 42 is deflected.

While the resistor 110 may be the sole source of heat for the furnace F, it may be employed as an auxiliary source of heat for taking care of temperature regulation of the furnace, and in such latter case any other suitable source of heat, as an additional resistor 110ª, Fig. 4, may simultaneously deliver heat to the furnace.

Where the furnace F is not electrically heated, but is heated by gas, liquid or other fuel, the nut member 107 will control the supply of such fuel, and where the latter is gas or liquid by operating a valve in the fuel supply pipe, as by operating a valve to different positions to allow admission of fuel at different rates.

This latter structure is illustrated in Fig. 5, where the nut member 107 is connected to and actuates the valve member $v$ of the valve V in the pipe P, which conducts liquid or gaseous fuel to the burner $b$ in the furnace F.

As indicated in Fig. 5, the burner $b$ may either be the sole source of heat for the furnace, or it may be a source auxiliary to the burner $b_1$.

While the example of my invention hereinbefore described refers to the regulation of temperature, as of a furnace or other heating device, it will be understood that my invention is applicable as well for effecting any other control by varying or changing a quantity of energy, force, pressure, delivery of fluid or solid material, etc., in such manner as to reach a predetermined magnitude in a predetermined time, with a varying rate of change, the rate of change ordinarily being greater at the start of a corrective control and gradually diminishing as the desired condition is approximated or reached.

The needle or pointer 42 may be the needle or movable element of any indicating or measuring apparatus or device responsive to or controlled by variation of a condition which it is desired to maintain constant by recourse to apparatus of the character hereinbefore described, or similar or equivalent apparatus having broadly or specifically a similar mode of operation.

What I claim is:

1. An automatic system for producing or maintaining a predetermined condition, as temperature, pressure, etc., comprising means responsive to departure from said predetermined condition, means for applying an agent for producing or maintaining said condition, and means controlled by said first named means for varying the application of said agent at a rate which is a function of the rate of change from or to said predetermined condition.

2. An automatic system for producing or maintaining a predetermined condition, as temperature, pressure, etc., comprising means responsive to departure from said predetermined condition, means for applying an agent for producing or maintaining said condition, and means controlled by said first named means for varying the application of said agent at a rate which is proportional to the rate of change from or to said predetermined condition.

3. An automatic system for producing or maintaining a predetermined condition, as temperature, pressure, etc., comprising means responsive to departure from said predetermined condition, means controlled by said means for decreasing the rate of change of a quantity in response to which said departure is reduced and said predetermined condition attained, and timing mechanism for determining the time in which said first and second named means coöperate to establish said predetermined condition.

4. An automatic system for producing or maintaining a predetermined condition, as temperature, pressure, etc., comprising means responsive to departure from said predetermined condition, means controlled by said first named means for decreasing by increments which vary with the magnitude of said departure the rate of change of a quantity is response to which said departure from said predetermined condition is reduced and said predetermined condition attained, and timing mechanism for determining the time in which said first and second named means coöperate to establish said predetermined condition.

5. An automatic system for producing or maintaining a predetermined condition, as temperature, pressure, etc., comprising automatic mechanism responsive to departure from said predetermined condition tending to render itself inoperative before said predetermined condition is established, means controlled by said automatic mechanism for establishing said predetemined condition, and mechanism controlling said automatic mechanism to prevent it from rendering itself inoperative until said means establishes said predetermined condition.

6. An automatic system for producing or maintaining a predetermined condition, as temperature, pressure, etc., comprising automatic mechanism responsive to departure from said predetermined condition tending to render itself inoperative before said predetermined condition is established, means controlled by said automatic mechanism for decreasing the rate of change of a quantity for establishing said predetermined condition, and mechanism controlling said automatic mechanism to prevent it from rendering itself inoperative until said means establishes said predetermined condition.

7. An automatic system for producing or maintaining a predetermined condition, as temperature, pressure, etc., comprising automatic mechanism responsive to departure from said predetermined condition tending to render itself inoperative before said predetermined condition is established, variable means for establishing said predetermined condition, a controller for said means, and means controlled by said automatic mechanism causing said controller to effect variation of said first named means by increments decreasing as said predetermined condition is approached.

8. An automatic system for producing or maintaining a predetermined condition, as temperature, pressure, etc., comprising automatic mechanism responsive to departure from said predetermined condition tending to render itself inoperative before said predetermined condition is established, variable means for establishing said predetermined condition, a controller for said means, means controlled by said automatic mechanism causing said controller to effect variation of said first named means by increments decreasing as said predetermined condition is approached, and mechanism controlling said automatic mechanism to prevent it becoming inoperative until said predetermined condition is established by said variable means.

9. The combination with a furnace, of means for delivering heat thereto, automatic mechanism responsive to departure of said furnace from a predetermined temperature comprising a temperature responsive device, a deflecting member controlled thereby, said heat delivering means controlled by said deflecting member when deflected for varying the heat input into said furnace, means controlled by said deflecting member tending to cause it to assume normal position for any temperature to which said temperature responsive device is subjected, and means preventing said deflecting member taking normal position until said furnace attains said predetermined temperature, whereby the heat input into said furnace is varied until said predetermined temperature is attained.

10. The combination with a furnace, of means for delivering heat thereto, automatic mechanism responsive to departure of said furnace from a predetermined temperature comprising a temperature responsive device, a deflecting member controlled thereby, said heat delivering means controlled by said deflecting member when deflected for varying the heat input into said furnace, means controlled by said deflecting member tending to cause it to assume normal position for any temperature to which said temperature responsive device is subjected, and means set into operation upon deflection of said deflecting member preventing said deflecting member taking normal position until said furnace attains said predetermined temperature.

11. The combination with a furnace, of means for delivering heat thereto, automatic mechanism responsive to departure of said furnace from a predetermined temperature comprising a temperature responsive device, an electric circuit controlled thereby, a galvanometer in said circuit, a deflecting member movable with the movable member of said galvanometer, mechanism controlled by said deflecting member for varying the heat input into said furnace and for controlling said electric circuit to cause return of said deflecting member to normal position, and means preventing control of said electric circuit to return said deflecting member to normal position until said furnace attains said predetermined temperature.

12. The combination with an electric furnace, of means for delivering heat thereto automatic mechanism responsive to departure of said furnace from predetermined temperature comprising a device responsive to temperature of said furnace, an electric circuit controlled thereby, a galvanometer in said circuit having a deflecting member, and means controlling said heat delivering means controlled by said deflecting member when deflected to cause variations in the heat delivered to said furnace by increments which decrease as said furnace approaches said predetermined temperature.

13. The combination with an electric furnace, of means for delivering heat thereto, automatic mechanism responsive to de ture of said furnace from predetermi. temperature comprising a device responsive to temperature of said furnace, an electric circuit controlled thereby, a galvanometer in said circuit having a deflecting member, means controlling said heat delivering means controlled by said deflecting member when deflected to cause variations in the heat delivered to said furnace by increments which decrease as said furnace approaches said predetermined temperature, and means causing continued control of said heating means by said deflecting member until said furnace attains said predetermined temperature.

14. The combination with an electric furnace, of means for delivering heat thereto, auxiliary heating means, automatic mechanism responsive to departure of said furnace from predetermined temperature tending to render itself inoperative before said predetermined temperature is established, said auxiliary heating means controlled by said automatic mechanism, and mechanism controlling said automatic mechanism to prevent it becoming inoperative until said furnace has attained said predetermined temperature.

15. The combination with an electric furnace, of means for delivering heat thereto, auxiliary heating means, automatic mechanism responsive to departure of said furnace from predetermined temperature tending to render itself inoperative before said predetermined temperature is established, said auxiliary heating means controlled by said automatic mechanism to vary the heat input into said furnace by increments which are large when the departure of said furnace from said predetermined temperature is large, said increments decreasing as said predetermined temperature is approached, and mechanism controlling said automatic mechanism to prevent it becoming inoperative until said furnace has attained said predetermined temperature.

16. An automatic system for producing or maintaining a predetermined condition, as temperature, pressure, etc., comprising means responsive to departure from said predetermined condition, means for applying an agent for producing or maintaining said condition, and means controlled by said first named means for varying the application of said agent at a rate which is a function of the extent of departure from said predetermined condition and of the rate of change from or to said predetermined condition.

17. An automatic system for producing or maintaining a predetermined condition, as temperature, pressure, etc., comprising means responsive to departure from said predetermined condition, means for applying an agent for producing or maintaining said condition, and means controlled by said first named means for varying the application of said agent at a rate which is proportional to the extent of departure from said predetermined condition and of the rate of change from or to said predetermined condition.

18. An automatic system for producing or maintaining a predetermined condition, as temperature, pressure, etc., comprising means responsive to departure from said predetermined condition, means for applying an agent for producing or maintaining said condition, means controlled by said first named means for varying the rate of application of said agent, and coöperating means controlling approach to said predetermined condition at a predetermined rate.

19. An automatic system for producing or maintaining a predetermined condition, as temperature, pressure, etc., comprising means responsive to departure from said predetermined condition, means for applying an agent for producing or maintaining said condition, and means controlled by said first named means controlling application of said agent at a rate dependent upon the variation of the rate of approach to said predetermined condition from a predetermined rate of approach to said condition.

20. An automatic system for producing or maintaining a predetermined condition, as temperature, pressure, etc., comprising means responsive to departure from said predetermined condition, means for applying an agent for producing or maintaining said condition, and means controlled by said first named means controlling application of said agent at a rate proportional to the variation of the rate of approach to said predetermined condition from a predetermined rate of approach to said condition.

21. An automatic system of temperature control comprising a device whose temperature is to be controlled, a heater therefor, temperature responsive means associated with said device, and means controlled by said temperature responsive means controlling said heater for varying application of heat to said device at a rate which is a function of the rate of change of temperature of said device from or to a predetermined temperature.

22. An automatic system of temperature control comprising a device whose temperature is to be controlled, a heater therefor, temperature responsive means associated with said device, and means controlled by said temperature responsive means controlling said heater for varying application of heat to said device at a rate which is proportional to the rate of change of temperature of said device from or to a predetermined temperature.

23. An automatic system of temperature control comprising a device whose temperature is to be controlled, a heater therefor, temperature responsive means associated with said device, and means controlled by said temperature responsive means controlling said heater for varying application of heat to said device at a rate which is a function of the extent of departure of temperature of said device from a predetermined temperature and of the rate of change of temperature of said device from or to said predetermined temperature.

24. An automatic system of temperature control comprising a device whose temperature is to be controlled, a heater therefor, temperature responsive means associated with said device, and means controlled by said temperature responsive means controlling said heater for varying application of heat to said device at a rate which is proportional to the extent of departure of temperature of said device from a predetermined temperature and to the rate of change of temperature of said device from or to said predetermined temperature.

25. An automatic system of temperature control comprising a device whose temperature is to be controlled, a heater therefor, temperature responsive means associated with said device, means controlled by said temperature responsive means controlling rate of application of heat by said heater to said device, and coöperating means controlling approach of temperature of said device at a predetermined rate to a predetermined temperature.

26. An automatic system of temperature control comprising a device whose temperature is to be controlled, a heater therefor, temperature responsive means associated with said device, and means controlled by said temperature responsive means controlling said heater to apply heat to said device at a rate dependent upon the variation of the rate of approach of temperature of said device to a predetermined temperature from a predetermined rate of approach to said temperature.

27. An automatic system of temperature control comprising a device whose temperature is to be controlled, a heater therefor, temperature responsive means associated with said device, and means controlled by said temperature responsive means controlling said heater to apply heat to said device at a rate proportional to the variation of the rate of approach of temperature of said device to a predetermined temperature from a predetermined rate of approach to said temperature.

28. An automatic system of temperature control comprising a device whose temperature is to be controlled, a heater therefor, temperature responsive means associated with said device, means controlled by said temperature responsive means for controlling said heater, and timing mechanism controlled by said temperature responsive device controlling duration of control of said heater.

29. An automatic system for producing or maintaining a predetermined condition, as temperature, pressure, etc., comprising means responsive to departure from said predetermined condition, means for applying an agent for producing or maintaining said condition, and means controlled by said first named means for first varying the rate of application of said agent by an excessive amount and thereafter reducing variation of said agent at a rate determined by the rate of approach to said predetermined condition.

30. The combination with a heating device, of a plurality of heaters therefor, one or more of said heaters operating at substantially constant rate, and automatic means responsive to the temperature produced by said heaters controlling another of said heaters.

31. The combination with a furnace, of a plurality of resistors for heating the same, and automatic means responsive to the temperature of said furnace controlling the electrical energy input into less than all of said resistors for controlling the temperature of said furnace.

In testimony whereof I have hereunto affixed my signature this 1st day of June, 1917.

MORRIS E. LEEDS.